(12) United States Patent
Lam et al.

(10) Patent No.: US 7,752,044 B2
(45) Date of Patent: Jul. 6, 2010

(54) METHOD FOR RECOGNIZING SPEECH

(75) Inventors: Yin Hay Lam, Stuttgart (DE); Ralf Kompe, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 1230 days.

(21) Appl. No.: 10/683,495

(22) Filed: Oct. 10, 2003

(65) Prior Publication Data
US 2004/0122671 A1 Jun. 24, 2004

(30) Foreign Application Priority Data
Oct. 14, 2002 (EP) .................................. 02022963

(51) Int. Cl.
*G10L 15/00* (2006.01)
*G10L 15/04* (2006.01)
(52) U.S. Cl. .................... 704/239; 704/231; 704/254
(58) Field of Classification Search ............. None
See application file for complete search history.

(56) References Cited

U.S. PATENT DOCUMENTS

| | | | | |
|---|---|---|---|---|
| 5,729,656 A | * | 3/1998 | Nahamoo et al. | 704/254 |
| 6,542,869 B1 | * | 4/2003 | Foote | 704/500 |
| 2002/0165715 A1 | * | 11/2002 | Riis et al. | 704/254 |

FOREIGN PATENT DOCUMENTS

EP   0 715 298   6/1996

OTHER PUBLICATIONS

Laureys et al, "Assessing Segmentations: Two Methods for Confidence Scoring Automatic HMM-Based Word Segmentations", Proc. of the 6th International Conf. on Engineering on Modern Electric Systems, May 2001.*
Kamppari S O et al: "Word and phone level acoustic confidence scoring" IEEE International Conference on Acoustics, Speech and Signal Processing, ICASSP 2000, vol. 3, Jun. 5-9, 2000, pp. 1799-1802, XP010507710.
Komori Y et al: "Robustness of a feature based phoneme segmentation system to speaker independent and continuous speech" Speech Processing 2, VLSI, Underwater Signal Processing. Toronto, May 14-17, 1991, International Conference on Acoustics, Speech & Signal Processing, ICASSP, New York, IEEE, US, vol. 2, Conf. 16, Apr. 14, 1991, pp. 885-888, XP010043114.
Jitsuhiro T et al: "Rejection of out-of-vocabulary words using phoneme confidence likelihood" Acoustics, Speech and Signal Processing, 1998. Proceedings of the 1998 IEEE International Conference on Seattle, WA, USA, May 12-15, 1998, New York, NY, USA, IEEE, US, May 12, 1998, pp. 217-220, XP010279087.
Brugnara et al., "Improved Connected Digit Recognition Using Spectral Variation Functions," ICSLP, 1992, pp. 627-630.
Goronzy et al., "Technical Report: Confidence Measures for an HMM Isolated Word Recognizer," Sony Internal Technical Report, May 12, 2000, pp. 1-37.
Duda et al., "Pattern Classification," John Wiley & Sons Inc., New York, 1973, pp. 360-363.
Rabiner et al., "Fundamentals of Speech Recognition," PTR Prentiss Hall, 1993, pp. 173-174.

* cited by examiner

*Primary Examiner*—David R Hudspeth
*Assistant Examiner*—Samuel G Neway
(74) *Attorney, Agent, or Firm*—Oblon, Spivak, McClelland, Maier & Neustadt, L.L.P.

(57) ABSTRACT

To increase the robustness and/or the recognition rate of methods for recognizing speech it is proposed to include phone boundary verification measure features in the process of obtaining and/or generating confidence measures obtained recognition results.

14 Claims, 5 Drawing Sheets

METHOD FOR RECOGNIZING SPEECH

BACKGROUND OF THE INVENTION

The present invention relates to a method for recognizing speech and in particular to a method for recognizing speech wherein phone boundary verification measures are used as confidence measure features for constructing a confidence measure for a recognition result.

In processes for recognizing speech obtained recognition results or parts thereof are often classified by deriving a so-called confidence measures providing measures or estimations for the reliability that a spoken utterance or parts thereof have been recognized correctly within the recognition process.

In known conventional schemes for obtaining and generating confidence measures it is not realized or taken into account that methods for recognizing speech sometimes give phone boundaries which are not plausible, in particular when recognition errors occur.

SUMMARY OF THE INVENTION

It is an object of the present invention to provide a method for recognizing speech, wherein a confidence measure can be provided which classifies the recognition result in a more reliable way.

In the inventive method for recognizing speech, speech input from at least one speaker is received. A process of recognizing speech is performed for said speech input, so as to obtain at least one recognition result or recognition hypothesis for said speech input. A confidence measure is obtained and/or generated from said speech input and/or from parts thereof for said at least one recognition result or recognition hypothesis or for parts thereof which is descriptive for the reliability of said recognition result or recognition hypothesis and/or for parts thereof for said speech input. Further, at least one sub-word unit boundary verification measure and in particular at least one phone boundary verification measure is obtained and/or generated from said speech input, said sub-word unit boundary verification measure being descriptive for boundaries of sub-word units or the like and/or for sub-word unit segmentations and in particular said phone boundary verification measure being descriptive for boundaries of phones, or the like within and/or for phone segmentations of said speech input and/or for their reliability. The process of obtaining and/or generating said confidence measure at least partially employs or is at least partially based on said sub-word unit boundary verification measure and in particular on said phone boundary verification measure.

It is therefore a basic aspect of the present invention to provide phone boundary verification measures and to use these phone boundary verification measures in the process of obtaining and/or generating the confidence measures necessary for describing the reliability of a recognition result or of a recognition hypothesis.

According to a preferred embodiment of the present invention at least one set of new features is derived from said phone boundary verification measure. In particular these new features are so-called phone boundary features. Additionally, the set of phone boundary features is used as a set of features for obtaining and/or for generating said confidence measure.

According to a further preferred embodiment of the present invention a set of confidence measure features is obtained and/or derived during said process of recognizing speech and/or from said obtained recognition result. This is in particular done for obtaining and/or for generating said confidence measure.

It is of particular advantage if the set of confidence measure features is obtained and/or generated to contain acoustic score-related features, in particular from frame, state, phone, word levels, and/or the like. Additionally or alternatively, temporal features may be included, in particular describing phone durations, and/or the like.

According to a further alternative of the present invention, a phone boundary verification measure function is obtained and/or used for obtaining and or for generating said phone boundary verification measure and/or said phone boundary features.

According to a further alternative of the present invention a phone boundary verification measure function is obtained and/or employed being capable of describing similarities and/or distances of left and right contexts and/or of left and right context vectors of phone boundaries.

For instance, a similarity function may be used as said phone boundary verification measure function or as a part thereof. In particular, said similarity functions may be capable of measuring a similarity s(x, y) of left and right contexts and/or of left and right context vectors x and y of phone boundaries.

In a particular embodiment of the inventive method, a normalized inner product of left and right context vectors x and y may be used as said similarity function s. Such a normalized inner product may be defined by $$s(x, y) = \frac{x^t y}{\|x\| \cdot \|y\|}. \tag{1}$$

Within this structure $x^t$ denotes a transposed left context vector x of a given phone boundary, y denotes a right context vector of said given phone boundary. Additionally $\|\cdot\|$ denotes the norm function on the vector space of said left and right context vectors x and y.

According to a further alternative of the present invention a distance measure d or a distance measure function d may be used as said phone boundary verification measure function or as a part thereof. This distance measure d may be capable of measuring a distance d (x, y) of left and right contexts and/or of left and right context vectors x and y of given phone boundaries.

According to the present invention spectral vectors may be used as said left and/or right context vectors x and y, in particular these context vectors x and y may be melfrequency cepstral vectors, or the like.

It is of further advantage to define a phone boundary k to be a boundary and/or a position thereof between a given first phone k within a given recognition result and a directly successing phone k+1 within said recognition result.

The present invention is majorly based on evaluation schemes with respect to left and right contexts regarding a given phone boundary. Therefore, there are different possibilities of constructing left and right contexts and for constructing left and right context vectors for a given phone boundary.

According to one possible alternative of the present invention it is provided to use and/or to involve as a left context for obtaining a left context vector x for a given phone boundary k all speech frames of a last state, in particular of a Hidden Markov Model HMM, for a given phone hypothesis k.

Additionally and/or alternatively, as a right context for obtaining a right context vector y for a given phone boundary k all speech frames of a first state, in particular of a Hidden Markov Model HMM, for a given phone hypothesis k+1 are used.

Further additionally or alternatively, as a left context for obtaining a left context vector x for a given phone boundary k all speech frames of a last second state, in particular of a Hidden Markov Model HMM, for a given phone hypothesis k are used.

Additionally and/or alternatively, as a right context for obtaining a right context vector x for a given phone boundary k all speech frames of a second state, in particular of a Hidden Markov Model HMM, for a phone hypothesis k+1 are used.

As a further alternative or further in addition, as a left context for obtaining a left context vector x for a given phone boundary k all n speech frames i−n, i−n+1, ..., i with n≦i are used.

Also as a right context for obtaining a right context vector y for a given phone boundary k+1 all m speech frames i+1, i+2, ..., i+m are used.

According to a further preferred embodiment of the inventive method for recognizing speech as a phone boundary verification measure function PB and/or as a phone boundary verification measure PBVM at a given phone boundary k a similarity function s or a distance measure d between two spectral left and right context vectors x and y, respectively, are used. This may be done for instance by using mean vectors representing left and right contexts of said given phone boundary k.

In particular it is possible to define said phone boundary verification measure function PB and/or said phone boundary verification measure PBVM to be $$PBVM(k) = \frac{1 - s(x, y)}{2} \text{ or} \qquad (2a)$$

$$PBVM(k) = \frac{1 - s(X'_{ls}(k), X'_{rs}(k))}{2}$$

or $$PBVM(k) = \frac{1 - d(x, y)}{2} \text{ or} \qquad (2b)$$

$$PBVM(k) = \frac{1 - d(X'_{ls}(k), X'_{rs}(k))}{2},$$

respectively.

There are several possibilities to choose said left and right context vectors x and y, respectively. These left and right context vectors x and y may be defined as spectral vector representations of left and right contexts $X_{ls}(k)$ and $X_{rs}(k)$, respectively, for a given phone boundary k. Also derivatives $X'_{ls}(k)$ and $X'_{rs}(k)$ thereof may be chosen, in particular $X_{ls}(k) - m_l(k)$, $X_{rs}(k) - m_r(k)$, or $\mu_l(k)$, $\mu_r(k)$, respectively, wherein $m_l(k)$, $m_r(k)$ denote mean spectra of left and right contexts, $\mu_l(k)$, $\mu_r(k)$ denote means of Gaussian distributions of respective states.

It is of further particular advantage to obtain and/or to generate for obtained different hypotheses as recognition results respective phone boundary verification measures PBVM and to combine said variety of respective phone boundary verification measures PBVM with each other, in particular to form a confidence measure feature.

There are various ways for combining a variety of phone boundary verification measures stemming from different recognition hypotheses. For example, the following quantities may be used to combine the values of phone boundary verification measures PBVM of all phone boundaries in a recognizer word hypothesis to form new confidence measure features for corresponding recognition results or recognition hypotheses:

- an average value of phone boundary verification measures in a recognition result (RR), and/or
- a minimum value of a phone boundary verification measure in a recognition result (RR), and/or
- a difference between a minimum and a maximum value of a phone boundary verification measure in a recognition result (RR), and/or
- a standard deviation of phone boundary verification measures within a recognition result (RR), and/or
- a coefficient variation of phone boundary verification measures within a recognition result (RR).

It is a further aspect of the invention to provide a system, an apparatus, a device, and/or the like for recognizing speech which is in each case capable of performing and/or realizing the inventive method for recognizing speech and/or the steps thereof.

Additionally, it is a further aspect of the invention to provide a computer program product, comprising computer program means which is adapted to perform and/or to realize the inventive method or recognizing speech or its steps when it is executed on a computer, a digital signal processing means, and/or the like.

The above-mentioned further aspects of the present invention will become more elucidated taking into account the following remarks:

Confidence measures (CM) provide a measure of the reliability with which a spoken word or utterance was recognized by the automatic speech recognizer. However, conventional CMs usually do not take into account the fact that speech recognizers sometimes give unplausible phone boundaries when recognition errors occur. A phone boundary verification measure (PBVM) is proposed which provides a measure of the reliability with which the phone boundaries of the recognizer output hypothesis indeed correspond to the real phone boundaries. A set of new features is then derived from the PBVM for confidence measures.

Distance measure and similarity measures are well-known in the literature, particularly in the field of pattern recognition. Similarity measures have been used to derive spectral variation function. Spectral variation function has mainly been used for speech recognition, automatic speech segmentation and phone labelling. Phoneme alignment is a standard algorithm in speech recognition. Confidence measures are also well-known.

However, phone boundary measure has never been applied for confidence measure.

Confidence measures are developed and used within e. g. a two-pass strategy, i. e. a set of features are extracted during the recognition process and from the recognizer output hypothesis. The features are then combined by a classifier like neural network and a linear classifier to give a confidence measure score. These features include acoustic score-related features from frame, state, phone and word level and also temporal features that measure the deviation of the phone duration from a pre-estimated distribution.

Confidence measures for both isolated word and large continuous speech recognizer have been successfully implemented.

Current conventional confidence measures are not able to give 100% correct classification rate on the recognizer output hypothesis. Features additional to the acoustic score-related features and temporal features need to be explored. Current conventional confidence measures are not able to classify recognition mistakes even though there are obvious phoneme misalignment in the recognizer hypothesis.

In contrast, the invention proposes new confidence measure features that measure explicitly such phone boundary mismatches.

In this invention, a phone boundary verification measure (PBVM) function is proposed. PBVM measures the similarity and/or distance between two vectors that represent the left and right contexts of a phone boundary. It provides a quantitative measure to judge if phone boundary mismatches have occurred in the recognizer output hypothesis. Such a measure is then used to derive new confidence measure features for each recognizer word hypothesis.

In PBVM, it is e. g. first proposed to use a similarity function and/or distance measure s(x,y) to measure the similarity and/or distance between two spectral vectors x and y, e. g. melfrequency cepstral vectors. For example, the normalized inner products of two vectors x and y, i. e. the angle between the vectors, provides a measure of similarity between two vectors:

$$s(x, y) = \frac{x^t y}{\|x\| \cdot \|y\|}. \tag{1}$$

Figure 3:
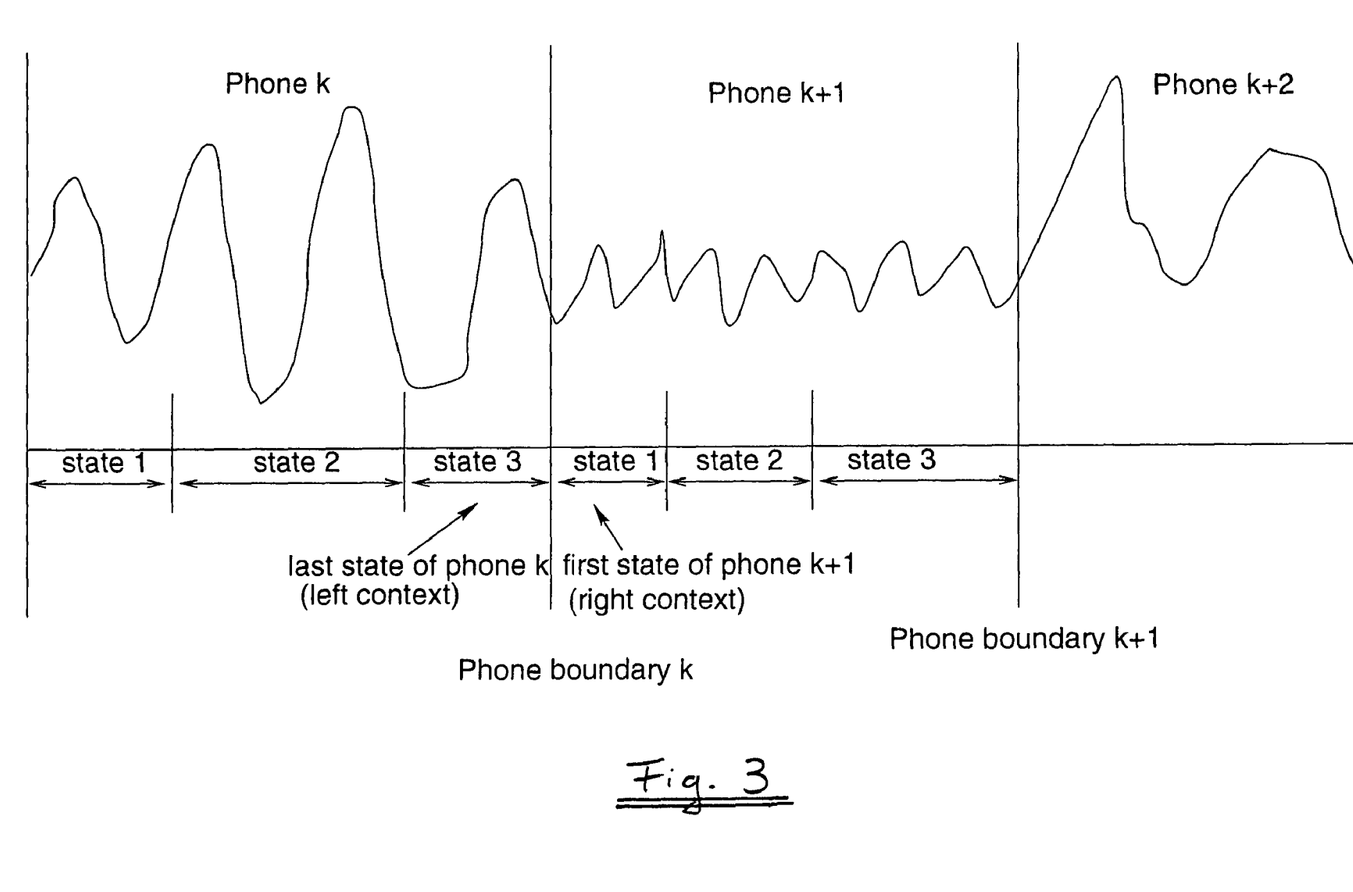
FIGS. 3-5 illustrate three different possibilities of defining left and right contexts for a given phone boundary k.
Figure 4:
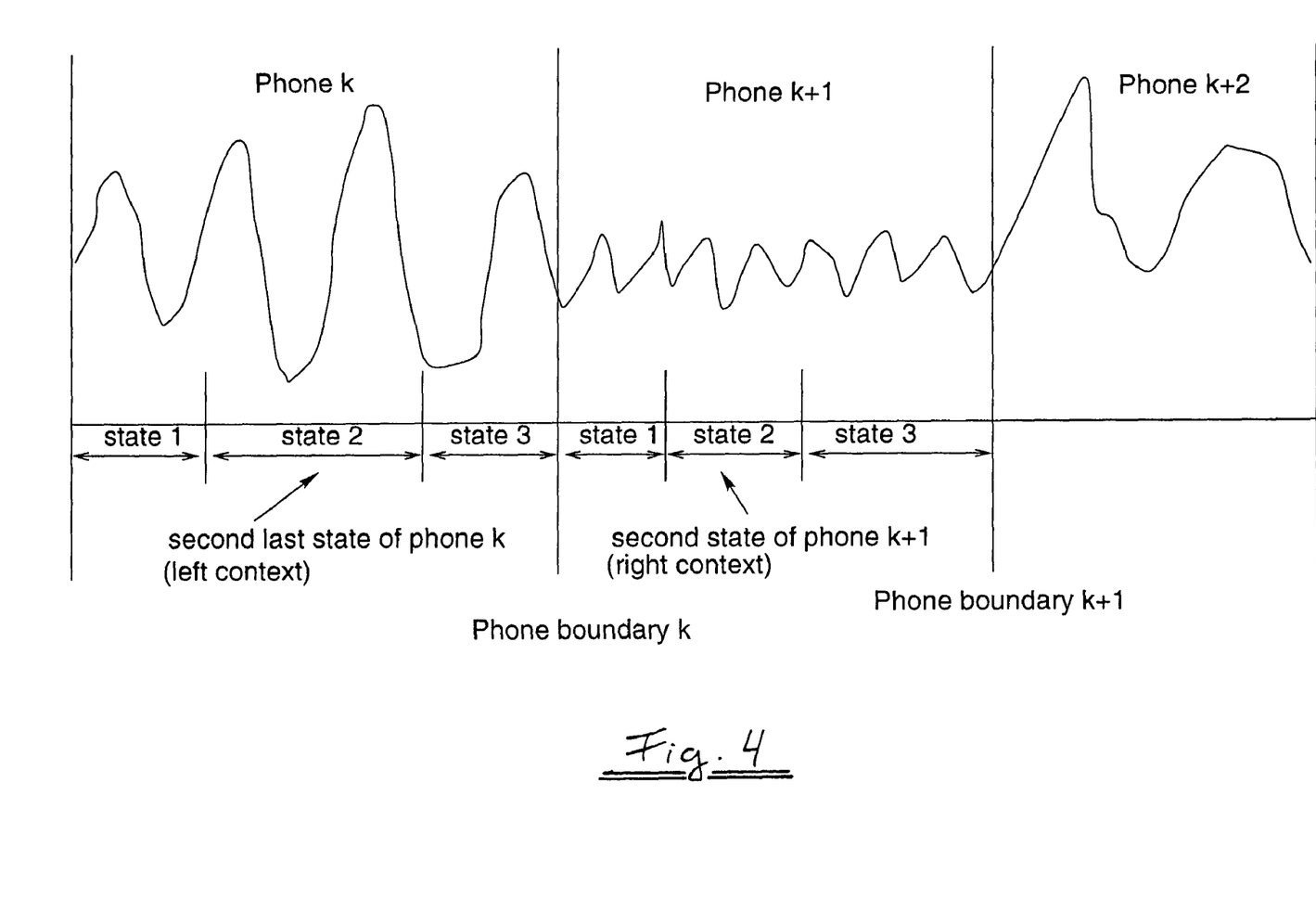
Figure 5:
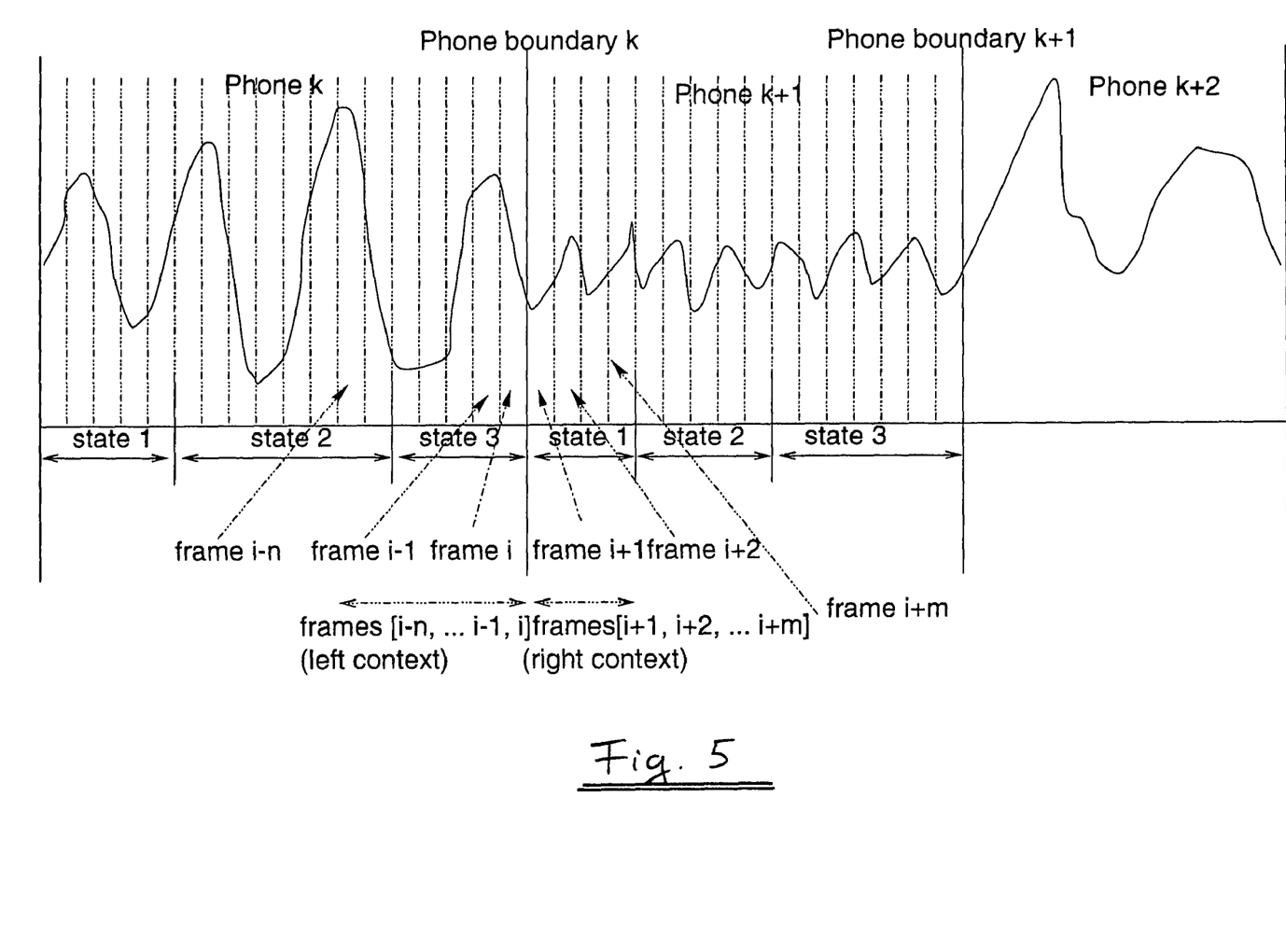

Second, a phone boundary k is defined as the boundary between phone k and phone k+1 in a speech recognizer word hypothesis. The left and right contexts of phone boundary k are then defined. Three possible context representations are given in the following examples:

- The left context consists of all the speech frames in the last Hidden Markov Model (HMM) state of phone hypothesis k and the right context contains those frames in the first HMM state of phone hypothesis k+1, as shown in FIG. 3, and/or
- the left context consists of all the speech frames in the last second Hidden Markov Model (HMM) state of phone hypothesis k and the right context contains those frames in the second HMM state of phone hypothesis k+1, as shown in FIG. 4, and/or
- the left context contains frames [i−n, i−n+1, . . . , i] and the right context contains frames [i+1, i+2, . . . , i+m], as shown in FIG. 5.

The phone boundary verification function PBVM(k) at phone boundary k is then defined as a function of the similarity function and/or distance measure between two spectral vectors, e. g. the mean vectors, that represent the left and right contexts of phone boundary k, for example, $$PBVM(k) = \frac{1 - s(x, y)}{2} \text{ or} \tag{2a}$$
$$PBVM(k) = \frac{1 - s(X'_{ls}(k), X'_{rs}(k))}{2} \text{ or}$$

$$PBVM(k) = \frac{1 - d(x, y)}{2} \text{ or} \tag{2b}$$
$$PBVM(k) = \frac{1 - d(X'_{ls}(k), X'_{rs}(k))}{2}, \text{ with}$$

$$X'_{ls}(k) = X_{ls}(k) \text{ and } X'_{rs}(k) = X_{rs}(k) \text{ or} \tag{3}$$

$$X'_{ls}(k) = X_{ls}(k) - m_l(k) \text{ and } X'_{rs}(k) = X_{rs}(k) - m_r(k) \tag{4}$$

Where $X_{ls}(k)$ and $X_{rs}(k)$ are the spectral vector representations of the left and right context of phone boundary k, $m_l(k)$ and $m_r(k)$ are the mean spectra of both left and right contexts $X_{ls}(k)$ and $X_{rs}(k)$.

If Gaussian densities are used to model the HMM states, the left and right contexts can also be represented by, for example, the mean of the Gaussian of the HMM states described in FIG. 3 and FIG. 4, $$X'_{ls}(k) = \mu_{ls}(k) \text{ or } X'_{rs}(k) = \mu_{rs}(k), \tag{5}$$

where $\mu_l(k)$ and $\mu_r(k)$ are the Gaussian means of the states that represent the left and right contexts $X_{ls}(k)$ and $X_{rs}(k)$.

In the example given in Equations (2a) and (2b), PBVM(k) is a continuous function between 0 and 1. The value PBVM(k)=0 corresponds to the extreme case that the average spectral vectors of the left and right contexts are identical to each other. This gives an indication that the phone boundary hypothesis is not the real phone boundary and hence a recognition error might occur. On the other hand, the value PBVM(k)=1 indicates another extreme case that two average spectral vectors are oriented in opposite directions, i.e., they are completely different to each other. This indicates that phone boundary k might indeed be the correct phone boundary in the speech signals. Hence, PBVM(k) provides a measure of the likelihood that phone boundary k is the real phone boundary.

As each word hypothesis may have a different number of phones, it is further proposed to combine all the PBVM(k) in a word to form a confidence measure feature. For example, the following quantities can be used to combine the values of phone boundary verification measure of all phone boundaries in a recognizer word hypothesis to form new CM features for the corresponding word hypothesis:

- The average value of the phone boundary verification measures in the word hypothesis, and/or
- the minimum value of the phone boundary verification measures in the word hypothesis, and/or
- the difference between the maximum and the minimum values of the phone boundary verification measures in the word hypothesis, and/or
- the standard deviation of the phone boundary verification measures within the word hypothesis, and/or
- the coefficient of variation of the phone boundary verification measures within the word hypothesis.

Each of the above CM features can be used as a confidence score directly or they can be combined with other features through a classifier to yield a confidence score. FIG. 4 gives an example of how PBVM can be used in CM for a speech recognizer.

Additionally, instead of using spectral vectors, time domain signals can also be used to represent the left and right contexts of phone hypothesis boundary k and hence to derive the phone boundary verification measure in a similar way as described above. Also, although the invention is mainly targeted at phone boundaries verification, the above idea can be applied to other sub-word unit boundary verification such as state boundaries and word boundaries, etc.

The following remarks will elucidate in more detail some aspects of the invention: The concept of confidence measures can be applied to both word level or utterance level. E.g., one speech utterance may be equivalent to one received speech input. For one received speech input or speech utterance, a process of recognizing speech is performed for said speech utterance or received speech input, so as to obtain at least one recognition result and each recognition result contain at least one word hypothesis. For example, given a speech input xxxx corresponding to "The weather today is nice", the recognizer generates two recognition results, e.g.:

1. "The weather yesterday is nice."

and

2. "The weather today is nice."

When a confidence measure is applied to the word level for each word hypothesis in the above recognition results, a confidence score is generated having the following values on the word level:

The weather yesterday is nice
0.9 0.86 0.13 0.8 0.95

Based on the confidence score and a given threshold, a word hypothesis in a recognition result is judged as reliable or unreliable. For example, in an application using speech recognition with confidence measure, when 0.5 is used as a threshold, then the word hypothesis "yesterday" is considered as being unreliable and hence is rejected or so and the other words are accepted.

When confidence measure is applied to the utterance level, then a confidence score is generated for the utterance in its entirety, e.g.:

The weather yesterday→is nice Confidence score.

If the confidence score is higher than a given threshold, then the whole utterance is considered as being reliable and is accepted. Otherwise, it will be considered as being unreliable and is rejected.

There are at least two approaches to generate an utterance level confidence score:

1. The generation of an utterance confidence score directly from some confidence measure features generated from the whole utterance.
2. The generation of a confidence score for each word hypothesis in the utterance and a following combination of the word confidence score to yield an utterance confidence score.

The proposed invention can be targeted at using phone boundary verification measure to form confidence measure features to generate a word level confidence score.

However, it is also within the scope of the invention to extend the concept of confidence measure to cover the confidence measure for the utterance level by using approach 1 described above. According to approach 1, it is possible to use the phone boundary verification measure for all phone boundaries in the speech utterance to directly generate confidence measure features to yield a confidence score for the whole or entire speech utterance. According to approach 2, a confidence score is generated for each word hypothesis by using phone boundary verification measure related features in the word and then combine the word confidence score to form an utterance confidence score.

In addition, it is also possible to use an utterance level confidence score to decide w.r.t. the final recognition result. For example, assume the speech recognizer gives the following multiple recognition results:

1. "The weather yesterday is nice." (utterance confidence score=0.75)

and

2. "The weather today is nice." (utterance confidence score=0.82).

Then the recognition result with the higher confidence score is selected as the final recognition result in an application.

BRIEF DESCRIPTION OF THE DRAWINGS

In the following further advantages and aspects of the present invention will be described taking reference to the accompanying Figures.

DESCRIPTION OF THE PREFERRED EMBODIMENTS

Figure 1:
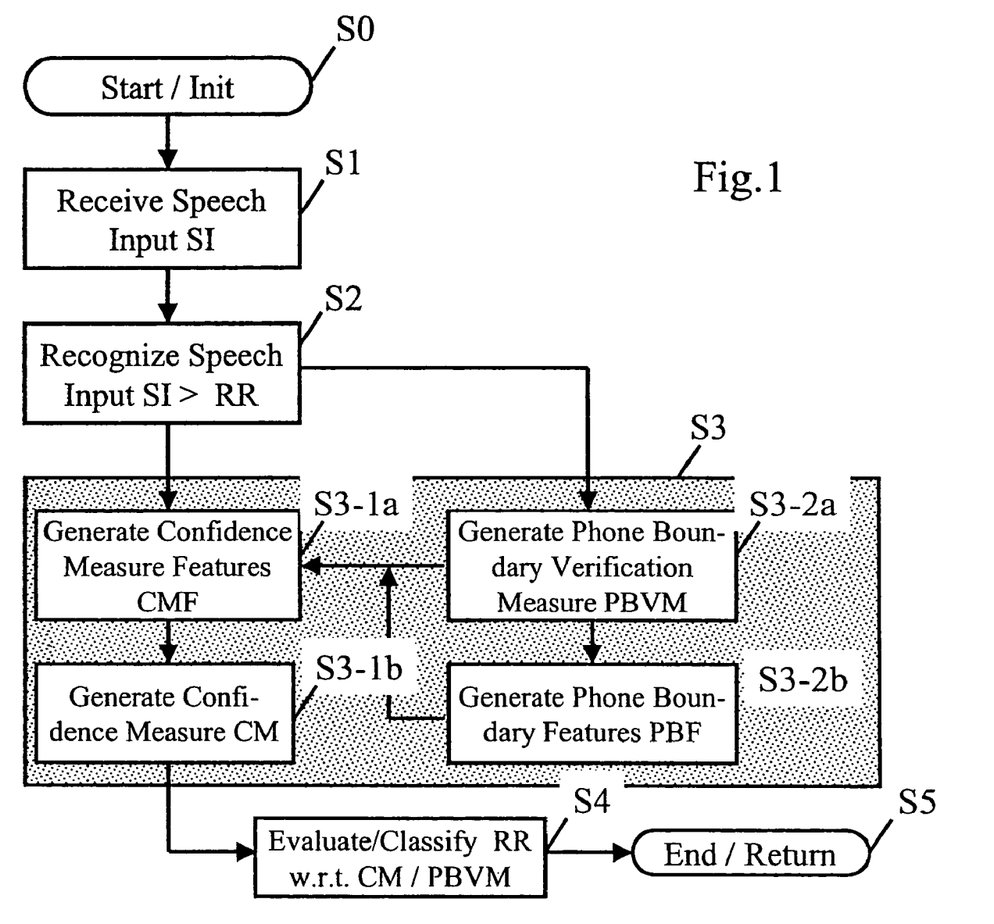
FIG. 1 is a schematical block diagram describing a preferred embodiment of the inventive method for recognizing speech.

A first example of the inventive method for recognizing speech is presented by means of a schematical block diagram of FIG. 1.

In a first step S0 the method is started and/or initialized. In step S1 speech input SI is received. In a following step S2 a process of recognizing said speech input SI is performed within step S2 resulting in one or a plurality of hypotheses as recognition results RR. The steps S3-1, S3-2a and S3-2b of section S3 can be performed sequentially or parallelly. In a first step S3-1 confidence measure features CMF are extracted from the recognition results RR and/or during the process of recognizing said speech input SI. In step S3-2a a phone boundary verification measure PBVM is generated and evaluated with respect to said recognized speech input SI and with respect to said recognition result RR of step S2. From said phone boundary verification measure phone boundary features PBF are constructed and/or extracted in step S3-2b. The generated phone boundary verification measure PBVM and/or the extracted phone boundary features PBF are fed into step S3-1b of generating a confidence measure CM. Based on said confidence measure and/or on said phone boundary verification measure PBVM the obtained recognition result RR is evaluated and/or classified. The embodiment of FIG. 1 ends or returns to a main routine of step S5.

Figure 2:
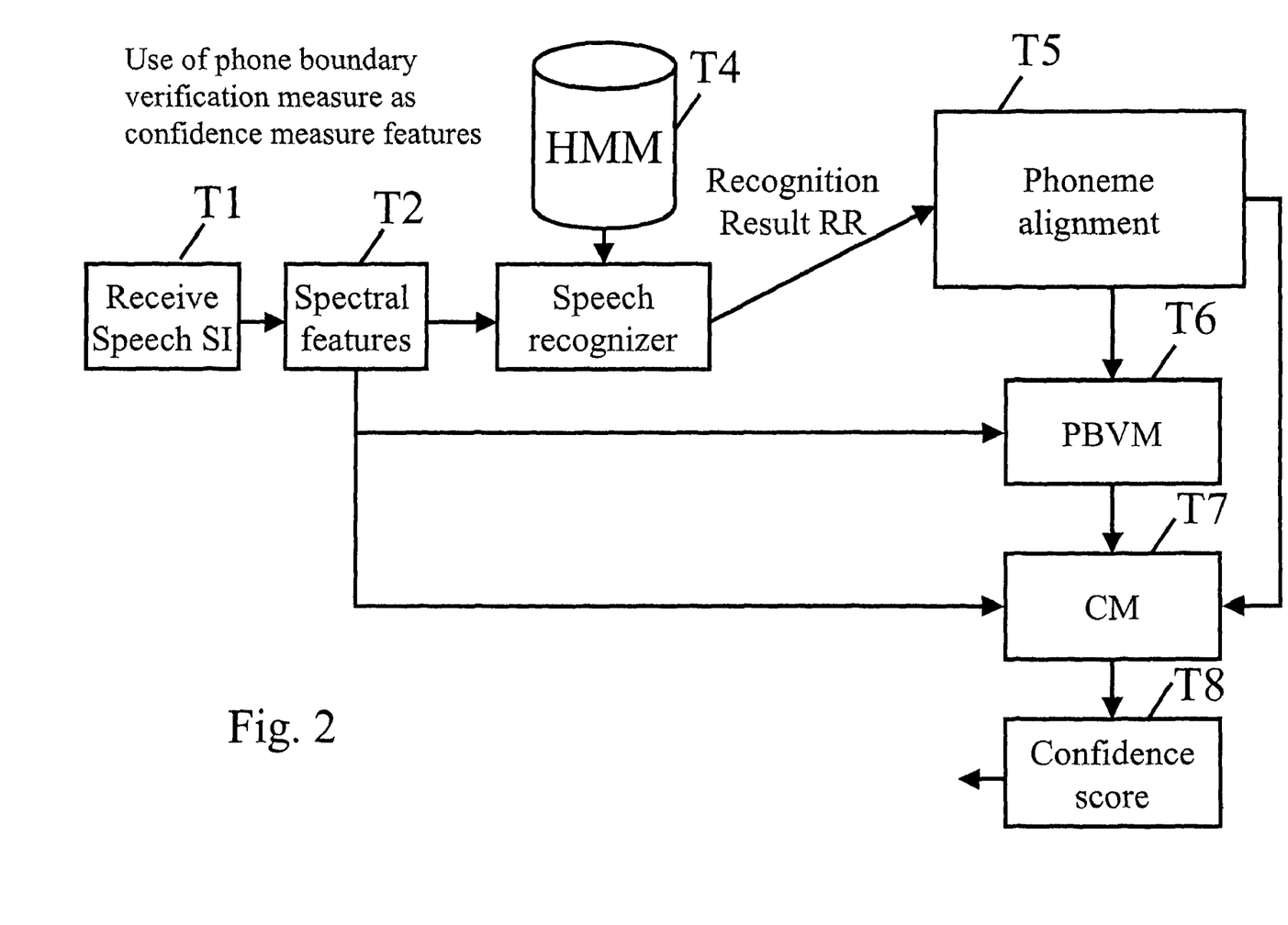
FIG. 2 is a schematical block diagram describing a further preferred embodiment of the inventive method for recognizing speech.

The schematical block diagram of FIG. 2 illustrates a further preferred embodiment of the inventive method for recognizing speech. In step T1 a speech input SI is received. In step T2 spectral features are extrcacted from the given speech input SI. Based on said spectral features a speech recognizer is applied to the speech input SI in step T3 taking into account a Hidden Markov Model T4 which leads to a recognition result RR. Based on the recognition result RR a phoneme alignment is extracted in step T5. Based on the spectral features of step T2 and on the phoneme alignment of step T5 a phone boundary verification measure PBVM is constructed and evaluated in step T6. In step T7 based on the spectral features of step T2, on the phone alignment information of step T5 and on the phone boundary verification measure of step T7 said confidence measure CM is constructed and evaluated, which is followed by a step T8 of constructing and evaluating a confidence score to classify the recognition results RR.

As already indicated above, FIGS. 3 to 5 describe the different situations with respect to the definition of left and right contexts.

According to a further aspect of the present invention a computer readable storage medium comprising the inventive computer program product is provided.

The invention claimed is:

1. A method of an information processing apparatus for recognizing speech, comprising:

receiving a speech input from at least one speaker;

performing a process of recognizing speech in said speech input, so as to obtain at least one recognition result for said speech input, wherein phoneme boundaries are given;

obtaining or generating, by the information processing apparatus, at least one confidence measure from said speech input for said recognition result, said confidence measure being descriptive of the reliability of said recognition result for said speech input;

obtaining or generating, by the information processing apparatus, phoneme boundary verification measures from said speech input, said phoneme boundary verification measures providing a measure of the likelihood that said phoneme boundaries are actual phoneme boundaries, wherein the process of obtaining or generating said confidence measure is at least partially based on an average value, a minimum value, a difference between a maximum value and the minimum value, a standard deviation, or a coefficient of variation of said phoneme boundary verification measures, said phoneme boundary verification measures are based on a similarity function s representing a similarity s(x, y) of left and right contexts or of left and right context vectors x, y of the phoneme boundaries, the left context for obtaining the left context vector x for one of said phoneme boundaries includes only speech frames of at least one of a group including only a last and a penultimate Hidden Markov Model state, the Hidden Markov Model to which the last and the penultimate Hidden Markov Model states belong modeling a preceding segment, preceding said one of said phoneme boundaries, and the right context for obtaining the right context vector y for the one of said phoneme boundaries includes only speech frames of at least one of a group including only a first and a second Hidden Markov Model state, the Hidden Markov Model to which the first and the second Hidden Markov Model states belong modeling a succeeding segment, succeeding said one of said phoneme boundaries.

2. The method according to claim 1, wherein a normalized inner product of the left and right context vectors x and y is used as said similarity function s, defined by:

$$s(x, y) = \frac{x^t y}{\|x\| \cdot \|y\|}, \quad (1)$$

with $x^t$ denoting a transposed left context vector x of said phoneme boundary, y denoting the right context vector of said phoneme boundary, and $\|\cdot\|$ denoting the norm function on the vector space of said left and right context vectors x and y.

3. A method of an information processing apparatus for recognizing speech, comprising:

determining segments of a speech input, each of the segments representing a phoneme and including a phoneme boundary to an adjacent segment;

determining, by the information processing apparatus, reliability measures of said phoneme boundaries, said plurality of reliability measures being a measure of the likelihood that said phoneme boundaries are actual phoneme boundaries; and determining, by the information processing apparatus, a confidence measure of a recognition result of said speech input based on an average value, a minimum value, a difference between a maximum value and the minimum value, a standard deviation, or a coefficient of variation of said reliability measures, said confidence measure being descriptive of a reliability of at least a part of said recognition result, wherein said reliability is measures are based on a similarity function s representing a similarity s(x, y) of left and right contexts or of left and right context vectors x, y of said phoneme boundaries, the left context for obtaining the left context vector x for one of said phoneme boundaries includes only speech frames of at least one of a group including only a last and a penultimate Hidden Markov Model state, the Hidden Markov Model to which the last and the penultimate Hidden Markov Model states belong modeling a preceding segment, preceding said one of said phoneme boundaries, and the right context for obtaining the right context vector y for said one of said phoneme boundaries includes only speech frames of at least one of a group including only a first and a second Hidden Markov Model state, the Hidden Markov Model to which the first and the second Hidden Markov Model states belong modeling a succeeding segment, succeeding said one of said phoneme boundaries.

4. The method according to claim 3, wherein said reliability is measures are based on a distance measure d representing a distance d(x, y) of left and right contexts or of left and right context vectors x, y of phoneme boundaries.

5. The method according to claims 1 or 4, wherein the left context for obtaining the left context vector x for the one of said phoneme boundaries includes all n speech frames i–n, i–n+1, ..., i with n<i of a last state, wherein i denotes the position of the speech frame preceding said one of said phoneme boundaries.

6. The method according to claims 1 or 4, wherein the right context for obtaining the right context vector y for the one of said phoneme boundaries includes all m speech frames i+1, iα2, ..., i+m of a last state, wherein i denotes the position of the speech frame preceding said one of said phoneme boundaries.

7. The method according to claim 3, wherein said reliability measures are based on the similarity function s or a distance measure d between two mean vectors x, y representing the left and right contexts of said phoneme boundaries.

8. The method according to claim 7, wherein said reliability measure is defined to be:

$$PBVM(k) = \frac{1 - s(x, y)}{2} \text{ or} \quad (2a)$$

$$PBVM(k) = \frac{1 - d(x, y)}{2}, \quad (2b).$$

9. The method according to claim 7, wherein said two mean vectors are defined to be spectral vector representations of left and right contexts $X_{ls}$, $X_{rs}$ of phoneme boundary, or derivatives defined as $X_{ls}-m_l$, $X_{rs}-m_r$, or $\mu_l$, $\mu_r$, wherein $m_l$, $m_r$ denote mean spectra of left and right contexts $X_{ls}$, $X_{rs}$, and $\mu_l$, $\mu_r$ denote means of Gaussian distributions of respective states.

10. The method according to claim 3, further comprising:

obtaining or generating for obtained different hypotheses as recognition results respective reliability measures; and combining said respective reliability measures to form a confidence measure feature.

11. The method according to claim 10, further comprising:

forming new confidence measure features of corresponding hypotheses by combining values of a phoneme boundary verification measure of all phoneme boundaries in the recognition result based on at least one of:

an average value of phoneme boundary verification measures in the recognition result, a minimum value of the phoneme boundary verification measures in the recognition result, a difference between a minimum and a maximum value of the phoneme boundary verification measures in the recognition result, a standard deviation of the phoneme boundary verification measures within the recognition result, and a coefficient variation of the phoneme boundary verification measures within the recognition result.

12. The method according to claim 3, wherein said reliability measures are based on at least one of a distance and a similarity, of left and right contexts of said phoneme boundaries.

13. A system for speech recognition, comprising:

a segmentation unit configured to determine segments of a speech input, each of the segments representing a phoneme and including a phoneme boundary to an adjacent segment; and a processing unit configured to determine reliability measures of said phoneme boundaries, said reliability measures being a measure of the likelihood that said phoneme boundaries are actual phoneme boundaries, and further configured to determine a confidence measure of a recognition result of said speech input based on an average value, a minimum value, a different between a maximum value and the minimum value, a standard deviation, or a coefficient of variation of said reliability measures, said confidence measure being descriptive of a reliability of at least a part of said recognition result, wherein said reliability measures are based on a similarity function s representing a similarity s(x, y) of left and right contexts or of left and right context vectors x, y of said phoneme boundaries, the left context for obtaining the left context vector x for one of said phoneme boundaries includes only speech frames of at least one of a group including only a last and a penultimate Hidden Markov Model state, the Hidden Markov Model to which the last and the penultimate Hidden Markov Model states belong modeling a preceding segment, preceding said one of said phoneme boundaries, and the right context for obtaining the right context vector y for said one of said phoneme y boundaries includes only speech frames of at least one of a group including only a first and a second Hidden Markov Model state, the Hidden Markov Model to which the first and the second Hidden Markov Model states belong modeling a succeeding segment, succeeding said one of said phoneme boundaries.

14. A computer readable storage medium including computer executable instructions, wherein the instructions, when executed by a processor, cause the processor to perform a method, comprising:

determining segments of a speech input, each of the segments representing a phoneme and including a phoneme boundary to an adjacent segment;

determining reliability measures of said phoneme boundaries, said reliability measures being a measure of the likelihood that said phoneme boundaries are actual phoneme boundaries; and determining a confidence measure of a recognition result of said speech input based on an average value, a minimum value, a difference between a maximum and the minimum value, a standard deviation, or a coefficient of variation of said reliability measures, said confidence measure being descriptive for a reliability of at least a part of said recognition result, wherein said reliability measures are based on a similarity function s representing a similarity s(x, y) of left and right contexts or of left and right context vectors x, y of said phoneme boundaries, the left context for obtaining the left context vector x for one of said phoneme boundaries includes only speech frames of at least one of a group including only a last and a penultimate Hidden Markov Model state, the Hidden Markov Model to which the last and the penultimate Hidden Markov Model states belong modeling a preceding segment, preceding said one of said phoneme boundaries, and the right context for obtaining the right context vector y for said one of said phoneme boundaries includes only speech frames of at least one of a group including only a first and a second Hidden Markov Model state, the Hidden Markov Model to which the first Hidden Markov Model states belong modeling a succeeding segment, succeeding said one of said phoneme boundaries.

* * * * *